(12) United States Patent
Lin et al.

(10) Patent No.: US 10,370,608 B2
(45) Date of Patent: Aug. 6, 2019

(54) DESULFURIZATION PROCESS USING A COMBINATION OF A SUSPENSION BED AND A FIXED BED

(71) Applicant: Beijing Huashi United Energy Technology and Development Co., Ltd., Beijing (CN)

(72) Inventors: Ke Lin, Beijing (CN); Lin Li, Beijing (CN); Lixin Guo, Beijing (CN); Gang Zhao, Beijing (CN)

(73) Assignee: BEIJING HUASHI UNITED ENERGY TECHNOLOGY AND .DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 15/861,192

(22) Filed: Jan. 3, 2018

(65) Prior Publication Data
US 2018/0298298 A1 Oct. 18, 2018

(30) Foreign Application Priority Data
Apr. 12, 2017 (CN) .......................... 2017 1 0236431

(51) Int. Cl.
*C10L 3/10* (2006.01)
*B01D 53/52* (2006.01)
(Continued)

(52) U.S. Cl.
CPC .............. *C10L 3/103* (2013.01); *B01D 53/52* (2013.01); *B01D 53/75* (2013.01); *B01D 53/80* (2013.01);
(Continued)

(58) Field of Classification Search
CPC ................ B01D 53/52; B01D 53/8612; B01D 2257/304; B01D 2258/02; B01D 2258/05;
(Continued)

(56) References Cited

U.S. PATENT DOCUMENTS

2011/0167713 A1    7/2011  Quignard et al.
2018/0296971 A1*  10/2018  Li .......................... B01D 53/52
(Continued)

FOREIGN PATENT DOCUMENTS

CN         1307926 A      8/2001
CN     201351763 Y    11/2009
(Continued)

OTHER PUBLICATIONS

Office Action dated Dec. 7, 2018 in connection with Russian Application No. 2018102186/05(002956).

*Primary Examiner* — Timothy C Vanoy
(74) *Attorney, Agent, or Firm* — Reches Patents

(57) ABSTRACT

A desulfurization process which uses both a suspension bed and a fixed bed is disclosed herein. In particular, the desulfurization slurry is mixed with a hydrogen sulfide containing gas to obtain a first mixture, and the first mixture passed into a suspension bed reactor from bottom to top, while controlling the first mixture to have a dwell time of 5-60 minutes in the reactor. A second mixture obtained by the reaction is subjected to gas liquid separation to produce a gas phase, and the gas phase is feed into a fixed bed reactor for a second desulfurization which produces purified gas. Advantageously, sulfur content in the hydrogen sulfide containing gas may be reduced from 2.4-140 g/Nm3 to 50 ppm or less by using a suspension bed, and the sulfur content may be even further reduced to less than 10 ppm in conjunction with a fixed bed.

20 Claims, 1 Drawing Sheet

(51) Int. Cl.
*B01D 53/80* (2006.01)
*B01D 53/75* (2006.01)
*B01D 53/82* (2006.01)

(52) U.S. Cl.
CPC ........ *B01D 53/82* (2013.01); *B01D 2251/602* (2013.01); *B01D 2251/604* (2013.01); *B01D 2253/1124* (2013.01); *B01D 2253/304* (2013.01); *B01D 2255/20738* (2013.01); *B01D 2255/20761* (2013.01); *B01D 2255/20792* (2013.01); *B01D 2256/24* (2013.01); *B01D 2257/304* (2013.01); *B01D 2258/05* (2013.01); *C10L 2250/06* (2013.01); *C10L 2290/12* (2013.01); *C10L 2290/541* (2013.01); *C10L 2290/542* (2013.01)

(58) Field of Classification Search
CPC ......... B01J 8/00; B01J 8/02; B01J 8/04; B01J 8/08; B01J 8/18; B01J 19/00; B01J 2219/00002; C10L 3/103; C10L 2250/06; C10L 2290/542; C10L 2290/541; C10K 1/004

See application file for complete search history.

(56) References Cited

U.S. PATENT DOCUMENTS

| | | | |
|---|---|---|---|
| 2018/0296975 A1* | 10/2018 | Li | B01D 53/52 |
| 2018/0296976 A1* | 10/2018 | Li | B01D 53/80 |
| 2018/0296977 A1* | 10/2018 | Lin | C10L 3/103 |

FOREIGN PATENT DOCUMENTS

| | | | | |
|---|---|---|---|---|
| CN | 102127462 A | * | 7/2011 | B01J 23/883 |
| CN | 102310005 A | * | 1/2012 | B01J 38/00 |
| CN | 103242871 A | | 8/2013 | |
| CN | 204051658 U | | 12/2014 | |
| CN | 104388117 A | | 3/2015 | |
| CN | 104588079 A | | 5/2015 | |
| CN | 204752627 U | | 11/2015 | |

* cited by examiner

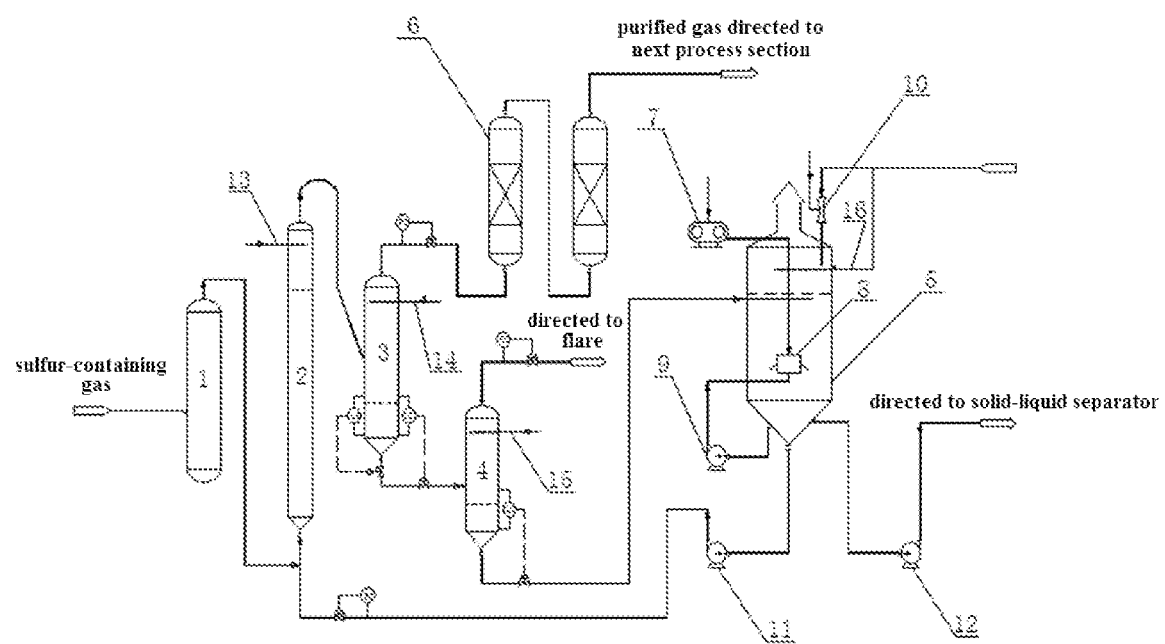

DESULFURIZATION PROCESS USING A COMBINATION OF A SUSPENSION BED AND A FIXED BED

RELATED APPLICATIONS

This application claims priority to Chinese Patent Application No. 201710236431.1, filed Apr. 12, 2017, the contents of which is herein incorporated by reference.

TECHNICAL FIELD

The present invention relates to the field of desulfurization technology, and more particularly to a high efficient desulfurization process using a suspension bed and a fixed bed in series.

BACKGROUND

The removal of $H_2S$ is involved in many occasions such as the deep processing and comprehensive utilization of coal, the exploitation of oil and gas, petroleum refining and petrochemical production. Currently, the industrial desulfurization method is divided into two kinds: dry desulfurization process and wet desulfurization process.

Dry desulfurization process and the regeneration method thereof employs solid adsorbent to remove the hydrogen sulfide and organic sulfur in the gas, which is simple and reliable in operation and has a relatively high degree of desulfurization. Dry desulfurization process is suitable for the treatment of a gas having low hydrogen sulfide content, and is often used for fine desulfurization. Iron oxide is a commonly used desulfurizer for dry desulfurization process, while other kinds of desulfurizers, such as activated carbon, molecular sieve, manganese oxide, zinc oxide, etc., are seldom used due to high cost.

Wet desulfurization process and the regeneration method thereof can be divided into physical absorption method, chemical absorption method and oxidation reduction method according to the solution absorption and regeneration method. Wet desulfurization process has large treatment capacity and continuous operation, suitable for the situation where three are large quantity of gas to be treated with high hydrogen sulfide content. The physical absorption method is mainly the low-temperature methanol method developed by the Linde Group and Lurgi Corporation in the early 1950s, and this method has high gas purification degree, can allow selective absorption of $CO_2$, $H_2S$ and separate removal and regeneration process thereof. However, the toxicity of methanol causes difficulties to the operation and maintenance. Chemical absorption methods mainly include monoethanolamine (MEA) method, N-methyldiethanolamine (MDEA) method and sulfone amine method, among which the monoethanolamine (MEA) method and MDEA desulfurization method are widely used in refinery gas and natural gas purification plant, and the sulfone amine method is mainly used for natural gas desulfurization industry, and is particularly effective for the removal of organic sulfides. Oxidation and reduction method is mainly used for the desulfurization of coke oven gas, and it mainly includes PDS method, tannin extract method, ADA method and modified ADA method. Oxidation and reduction method for desulfurization has low sour gas loading, large required solution circulation and high operation costs, and furthermore, the desulfurization waste liquid will produce secondary sewage and other problems.

In summary, among the existing desulfurization processes and regeneration methods, the amine method has annual desulfurization amount of more than 10,000 tons, and the dry desulfurization method has annual desulfurization amount of tens of tons to hundreds of tons commonly. For example, Chinese patent application document with a publication number of CN1307926A discloses a dry desulfurization process for flue gas using a circulating suspension bed and the regeneration method thereof, characterized by using a desulfurizer prepared by mixing dry lime, fly ash separated from a dust collector and water according to a certain proportion. The obtained desulfurizer has a certain activity and moisture content (8~15%). The flue gas is injected into an absorption tower of the circulating suspension bed from the bottom thereof via a low resistance flue gas jet mechanism, and meanwhile atomized cooling water and the desulfurizer are separately sprayed into the lower part and the bottom of absorption tower of the circulating suspension bed. Most of the desulfurizer is circulated in the tower with an internal separation unit provided at the upper portion of the absorption tower of the suspension bed, and unreacted desulfurizer bed material leaving with the flue gas is separated through a gas-solid separation device provided outside the suspension bed and is sent back to the bed, thereby ensuring the utilization of the calcium-based desulfurizer. This method has overcome the drawbacks that the mortar pipeline are prone to fouling and clogging and flow resistance of flue gas is high and thus the costs is high for the system operation and maintenance when the lime slurry is directly used as the desulfurizer.

However, the "suspension bed" used in the above technique is actually a "fluidized bed", wherein the solid desulfurizer is suspended in the flue gas flowing from bottom to up. It is well known that the distribution of solid particles in the bed is inhomogeneous in such a gas-solid fluidized bed, and the bed presents a two-phase structure, wherein one phase is a continuous phase with a relatively uniform distribution of particle concentration and porosity distribution close to the initial fluidized state, and the other phase is a discontinuous bubble phase that carries a small amount of particles moving upward through the bed. The excess amount of gas required for the initial fluidization gathers to form bubbles which moves upwards and gets ruptured on the bed surface to throw the particles to the space above the bed, which will result in large fluctuations of the bed interface and fluctuations of pressure drop. More unfavorably, the gas passing quickly through the bed in the form of bubbles has very little contact with the particles, while the gas in the continuous phase have a long contacting time with the particles due to the low velocity of gas, therefore resulting in nonuniform gas-solid contact, so the desulfurization efficiency of the above fluidized bed process can hardly meet the industrial requirements. Therefore, in view of small and medium-sized desulfurization projects, it is urgent to find a desulfurization process and regeneration method which have high desulfurization efficiency, simple operation, no secondary pollution, small occupation of land and low cost.

SUMMARY OF THE INVENTION

The present invention is designed to overcome the defects of low desulfurization efficiency, complicated process and equipment of the existing desulphurization process, and further to provide a desulfurization process using a combination of a suspension bed and a fixed bed with high desulfurization efficiency, simple process and low equipment investment. The process can convert hydrogen sulfide in a feed gas directly into sulfur without secondary pollution.

For this purpose, the above-mentioned object of the present invention is achieved by the following technical solutions:

In one aspect, the present invention provides a desulfurization process using a combination of a suspension bed and a fixed bed, characterized by comprising the following steps:

(1), mixing a desulfurizer with water uniformly to prepare a desulfurization slurry;

(2), mixing the desulfurization slurry with a hydrogen sulfide containing gas to obtain a first mixture, and passing the first mixture into a suspension bed reactor from bottom to top, with controlling the first mixture to have a dwell time of 5-60 minutes in the suspension bed reactor to allow the desulfurization slurry to contact and react sufficiently with the hydrogen sulfide containing gas;

(3), discharging a second mixture from the top of the suspension bed reactor, and subjecting the second mixture to gas liquid separation, and collecting a gas phase; and (4), feeding the gas phase into a fixed bed reactor for carrying out a second desulfurization to obtain a purified gas.

Preferably, in step (1), the desulfurizer has a particle size of no greater than 20 μm.

Preferably, the desulfurizer is selected from a group consisting of amorphous iron oxide hydroxide, iron oxide, iron hydroxide or any mixture thereof.

Preferably, the desulfurization slurry has a desulfurizer concentration of 1-5 wt %, preferably 2-3 wt %.

Preferably, the hydrogen sulfide containing gas is selected from a group consisting of biogas, coke oven gas, oilfield associated gas, natural gas, petrochemical gas or any mixture thereof.

Preferably, the suspension bed reactor has an empty tower gas velocity of 0.03-0.3 m/s, preferably 0.05-0.2 m/s.

Preferably, there is one suspension bed reactor, or at least two suspension bed reactors connected in series and/or in parallel.

Preferably, in step (4), the fixed bed reactor comprises a desulfurizer selected from a group consisting of amorphous iron oxide hydroxide, iron oxide, iron hydroxide, copper oxide, zinc oxide, and any mixture thereof.

Preferably, the fixed bed reactor has a gas flow rate of from 1 to 20 m/s.

Preferably, the desulfurization process further comprises pre-treating the hydrogen sulfide containing gas to remove heavy components above C5 in prior to mixing the hydrogen sulfide containing gas with the desulfurization slurry in the Step (2).

Preferably, the desulfurization process further comprises: subjecting a rich solution obtained from the gas-liquid separation to flash evaporation and then reacting with an oxygen-containing gas to realize regeneration to produce a barren solution which is then recycled to the Step (2) for being used as the desulfurization slurry.

Preferably, the flash evaporation has a pressure drop of 0.1-0.4 MPa.

Preferably, the oxygen-containing gas has an actual consumption amount which is 5-15 times of a theoretical consumption amount thereof, and the regeneration lasts for a period of 30-60 minutes.

Preferably, at least a part of the rich solution is replaced with fresh desulfurization slurry when the rich solution reaches a sulfur capacity of 300% or more; and wherein the replaced part of the rich solution is subjected to solid-liquid separation to produce solid sulfur and a liquid phase, wherein the solid sulfur is delivered out and the liquid phase is returned to an oxidation regeneration tank for being used as a recycling supplementary moisture.

The suspension bed reactor of the present invention adopts empty tube structure, full tank operation, without controlling the liquid level.

The technical solution of the present invention has the following advantages:

1. The desulfurization process using a combination of a suspension bed and a fixed bed of the present invention comprises mixing the desulfurization slurry with a hydrogen sulfide containing gas to obtain a first mixture, and passing the first mixture into a suspension bed reactor from bottom to top wherein the desulfurization slurry contacts and reacts sufficiently with the hydrogen sulfide containing gas during a dwell time of 5-60 minutes to produce a second mixture, i.e. a gas-solid-liquid three-phase mixture, in the suspension bed reactor; and subjecting the second mixture to gas liquid separation to produce a rich solution and a gas phase, and feeding the gas phase into a fixed bed reactor for carrying out a second desulfurization to obtain a purified gas. The process of the present invention may reduce the hydrogen sulfide content in the hydrogen sulfide containing gas from 2.4-140 g/Nm³ to 50 ppm or less, so that the desulfurization efficiency of the suspension bed is 98% or more. The sulfur content can be further reduced to less than 10 ppm in conjunction with a fixed bed. The invention achieves high efficient desulfurization by combining the crude desulfurization of the suspension bed with fine desulfurization of the fixed bed connected in series. Therefore, the process of the present invention is simple and reasonable, with high desulfurization efficiency, simple equipment, little occupation of land and low investment, which is very suitable for industrial promotion.

2. The desulfurization process using a combination of a suspension bed and a fixed bed of the present invention employs amorphous iron oxide hydroxide as the desulfurizer, which has low price, high sulfur capacity and long switching period and is easy to be regenerated, so that the invention has low investment and low operation cost.

The principle of desulfurization and regeneration of amorphous iron oxide hydroxide is:

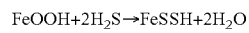

FeOOH+2H₂S→FeSSH+2H₂O

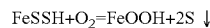

FeSSH+O₂=FeOOH+2S↓

The above desulfurization and regeneration constitute a cycle, through which $H_2S$ is oxidized to elemental sulfur, and amorphous iron oxide hydroxide just plays a role of catalyst, having no consumption itself. Desulfurization with iron oxide hydroxide has an important feature, that is, $H_2S$ is removed not in the form of molecules by the iron oxide hydroxide. The desulfurization process is very rapid, because $H_2S$ is firstly dissociated into $HS^-$ and $S^{2-}$ ions in the water film on the surface of iron oxide, then the $HS^-$ and $S^{2-}$ ions proceed with ion exchange with the lattice oxygen ($O^{2-}$) and the lattice hydroxyl ($OH^-$) in the iron oxide hydroxide.

3. The desulfurization process using a combination of a suspension bed and a fixed bed of the present invention comprises pretreating the hydrogen sulfide containing gas to remove heavy components above C5, in order to prevent occurrence of foaming. Foaming may be caused by introduction of heavy components above C5 into the subsequent system, thereby causing the increase of gas pressure drop at the time of regeneration, further affecting the regeneration effect.

4. The desulfurization process using a combination of a suspension bed and a fixed bed of the present invention comprises subjecting the rich solution to flash evaporation to remove light hydrocarbons contained therein, thereby avoiding dangers of fire or explosion which may be caused due to introduction of the light hydrocarbons into the oxidation regeneration process.

5. The desulfurization process using a combination of a suspension bed and a fixed bed of the present invention comprises replacing at least a part of the rich solution with fresh desulfurization slurry when the rich solution reaches a sulfur capacity of 300% or more, i.e. reaching subsaturation and saturation, thereby ensuring the desulfurization efficiency. The replaced part of the rich solution is subjected to solid-liquid separation to produce solid sulfur and a liquid phase, wherein the solid sulfur is mainly coarse sulfur, which can be sold as a product, thereby reducing the cost of desulfurization, and the liquid phase is returned to an oxidation regeneration tank for being used as a recycling supplementary moisture, which is conducive to improve the utilization of water resources.

BRIEF DESCRIPTION OF THE DRAWINGS

The above and other features of the present invention or the technical solutions in the prior art will now be described in detail with reference to certain example embodiments thereof illustrated in the accompanying drawings. It should be understood that the embodiments and drawings are given hereinbelow by way of illustration only, and thus are not limitative of the present invention, and apparent modifications can be made by those skilled in the art without paying any creative work, and wherein:

FIG. 1 is a flow chart of Embodiment 3 showing a desulfurization process using a combination of a suspension bed and a fixed bed, and wherein:

The reference numerals are as follows:

1-coalescer; 2-suspension bed reactor; 3-gas liquid separation tank; 4-flash evaporation tank; 5-oxidation regeneration tank; 6-fixed bed reactor; 7-blower; 8-aerator; 9-aeration pump; 10-venturi mixer; 11-barren solution pump; 12-saturated slurry pump; 13-first sprinkler means; 14-second sprinkler means; 15-third sprinkler means; 16-fourth sprinkler means.

DETAILED DESCRIPTION OF EMBODIMENTS

The technical solution of the present invention will now be described in detail with reference to the accompanying drawings. Obviously, the described embodiments are exemplary embodiments of the invention, rather than all embodiments. Based on embodiments in the present invention, all other embodiments obtained by those skilled in the art without making creative work are within the scope of the present invention.

In the description of the present invention, unless otherwise expressly stated and defined, the terms "connected" and "connected" should be broadly understood, for example, it may be a fixed connection, a detachable connection or an integral connection; it may be either directly connected or indirectly connected through an intermediate medium, or may be an internal communication between the two elements. It will be apparent to those skilled in the art that the specific meaning of the above terms in the present invention may be understood depending on the actual situation. In addition, the technical features described in different embodiments of the present invention described below may be recombined with each other as long as they do not form a conflict with each other.

In the following embodiments, the desulfurization efficiency of the suspension bed=(total mass of hydrogen sulfide in a feed gas−mass of hydrogen sulfide in the gas after the desulfurization with the suspension bed)/the total mass of the hydrogen sulfide in the feed gas; regeneration efficiency=mass of sulfur/(mass of the catalyst+mass of sulfur).

Embodiment 1

The desulfurization process using a combination of a suspension bed and a fixed bed provided by the present embodiment comprises the following steps:

(1) mixing magnetism ferric oxide having a particle size of 1-20 μm with water uniformly to prepare a desulfurization slurry having a concentration of 1 wt %;

(2) mixing a biogas having $H_2S$ content of 71.2 $g/Nm^3$ with the desulfurization slurry to obtain a first mixture, and passing the first mixture into a first suspension bed reactor having an empty tower gas velocity of 0.3 m/s from bottom to top, and controlling the first mixture to have a dwell time of 5-7 minutes in the first suspension bed, then discharging a second mixture from the top of the first suspension bed reactor, and passing the second mixture into a second suspension bed reactor having an empty tower gas velocity of 0.3 m/s from the bottom thereof, and controlling the second mixture to have a dwell time of 5 minutes in the second suspension bed reactor, such that the biogas contacts and reacts sufficiently with the desulfurization slurry in the two suspension bed reactors connected in series;

(3) discharging a gas-solid-liquid three-phase mixture from the top of the second suspension bed reactor, and subjecting the mixture to gas liquid separation to produce a gas phase and a rich solution, wherein the gas phase was determined to have a $H_2S$ content of 45 ppm, and the desulfurization efficiency was 99.6%;

(4) feeding the gas phase into a fixed bed reactor filled with iron hydroxide as desulfurizer for carrying out a second desulfurization, with keeping a gas flow rate of 3 m/s in the fixed bed reactor, to obtain a purified gas which was determined to have a $H_2S$ content of 8 ppm.

Embodiment 2

The desulfurization process using a combination of a suspension bed and a fixed bed provided by the present embodiment comprises the following steps:

(1) mixing ferric hydroxide having a particle size of 5-15 μm with water uniformly to prepare a desulfurization slurry having a concentration of 2 wt %;

(2) mixing coke oven gas having a $H_2S$ content of 2.4 $g/Nm^3$ with the desulfurization slurry to obtain a first mixture, and passing the first mixture into a suspension bed reactor having an empty tower gas velocity of 0.15 m/s from bottom to top, and controlling the first mixture to have a dwell time of 6-8 minutes in the suspension bed reactor to allow the coke oven gas contacts and reacts sufficiently with the desulfurization slurry;

(3) discharging a gas-solid-liquid three-phase mixture from the top of the suspension bed reactor and subjecting the mixture to gas liquid separation to produce a rich solution and a gas phase, wherein the gas phase was determined to have a $H_2S$ content of 50 ppm, and the desulfurization efficiency was 98%;

(4) feeding the gas phase into a fixed bed reactor filled with magnetic iron oxide as desulfurizer for carrying out a second desulfurization, with keeping a gas flow rate of 6 m/s in the fixed bed reactor, to obtain a purified gas which was determined to have a $H_2S$ content of 3 ppm.

Embodiment 3

As shown in FIG. 1, the desulfurization process using a combination of a suspension bed and a fixed bed provided by the present embodiment comprises the following steps:
(1) mixing amorphous iron oxide hydroxide having a particle size of 5-20 μm with water uniformly to prepare a desulfurization slurry having a concentration of 2.5 wt %;
(2) feeding a natural gas having a $H_2S$ content of 140 g/Nm$^3$ into a coalescer tank to remove heavy components above C5, and mixing the natural gas discharged from the coalescer tank with the desulfurization slurry to obtain a first mixture, and passing the first mixture into a suspension bed reactor having an empty tower gas velocity of 0.2 m/s from bottom to top, and controlling the first mixture to have a dwell time of 30-35 minutes in the suspension bed reactor such that the natural gas contacts and reacts sufficiently with the desulfurization slurry;
(3) discharging a gas-solid-liquid three-phase mixture from the top of the suspension bed reactor, and subjecting the mixture to gas liquid separation to produce a rich solution and a purified gas, wherein the purified gas was determined to have a $H_2S$ content of 41 ppm;
(4) feeding the purified gas into a fixed bed reactor filled with amorphous iron oxide hydroxide as desulfurizer for carrying out a second desulfurization, with keeping a gas flow rate of 1.8 m/s in the fixed bed reactor, to obtain a second purified gas which was determined to have a $H_2S$ content of 3 ppm;
(5) feeding the rich solution into a flash evaporation tank having a pressure drop of 0.17 MPa for undergoing flash evaporation to remove light hydrocarbon, and then feeding the rich solution into a regeneration tank for undergoing reaction with air for 55 minutes, wherein the introduction amount of air during the reaction is 11 times of a theoretical consumption amount thereof, to produce a barren solution, wherein the regeneration efficiency is 78%; and the barren solution is then recycled to the Step (2) for being used as the desulfurization slurry;
replacing half of the rich solution in the regeneration tank with fresh desulfurization slurry when the rich solution reaches a sulfur capacity of 300%, considered as saturated, and subjecting the replaced rich solution to solid-liquid separation to produce solid sulfur and a liquid phase, wherein the solid sulfur is delivered out and the liquid phase is returned to the oxidation regeneration tank for being used as a recycling supplementary moisture.

Embodiment 4

As shown in FIG. 1, the desulfurization process using a combination of a suspension bed and a fixed bed provided by the present embodiment comprises the following steps:
(1) mixing amorphous iron oxide hydroxide having a particle size of 1-20 μm with water uniformly to prepare a desulfurization slurry having a concentration of 3 wt %;
(2) feeding an oilfield associated gas having a $H_2S$ content of 108 g/Nm$^3$ into a coalescer tank to remove heavy components above C5, and mixing the oilfield associated gas discharged from the coalescer tank with the desulfurization slurry to obtain a first mixture, and passing the first mixture into a suspension bed reactor having an empty tower gas velocity of 0.05 m/s from bottom to top, and controlling the first mixture to have a dwell time of 20 minutes in the suspension bed reactor such that the oilfield associated gas contacts and reacts sufficiently with the desulfurization slurry;
(3) discharging a gas-solid-liquid three-phase mixture from the top of the suspension bed reactor, and subjecting the mixture to gas liquid separation to produce a rich solution and a purified gas, wherein the purified gas was determined to have a $H_2S$ content of 43 ppm;
(4) feeding the purified gas into a fixed bed reactor filled with amorphous iron oxide hydroxide as desulfurizer for carrying out a second desulfurization, with keeping a gas flow rate of 4 m/s in the fixed bed reactor, to obtain a second purified gas which was determined to have a $H_2S$ content of 5 ppm;
(5) feeding the rich solution into a flash evaporation tank having a pressure drop of 0.23 MPa for undergoing flash evaporation to remove light hydrocarbon, and then feeding the rich solution into a regeneration tank for undergoing reaction with air for 50 minutes, wherein the introduction amount of air during the reaction is 15 times of a theoretical consumption amount thereof, to realize regeneration to produce a barren solution, wherein the regeneration efficiency is 66%; and the barren solution obtained by regeneration is then recycled to the Step (2) for being used as the desulfurization slurry;
replacing all of the rich solution in the regeneration tank with fresh desulfurization slurry when the rich solution reaches a sulfur capacity of 300%, considered as saturated, and subjecting the replaced rich solution to solid-liquid separation to produce solid sulfur and a liquid phase, wherein the solid sulfur is delivered out and the liquid phase is returned to the oxidation regeneration tank for being used as a recycling supplementary moisture.

Embodiment 5

As shown in FIG. 1, the desulfurization process using a combination of a suspension bed and a fixed bed provided by the present embodiment comprises the following steps:
(1) mixing amorphous iron oxide hydroxide having a particle size of 10-15 μm with water uniformly to prepare a desulfurization slurry with a concentration of 5 wt %;
(2) feeding a petrochemical gas having a $H_2S$ content of 35 g/Nm$^3$ into a coalescer tank to remove heavy components above C5, and mixing the petrochemical gas discharged from the coalescer tank with the desulfurization slurry to obtain a first mixture, and passing the first mixture into a suspension bed reactor having an empty tower gas velocity of 0.3 m/s from bottom to top, and controlling the first mixture to have a dwell time of 40 minutes in the suspension bed reactor such that the petrochemical gas contacts and reacts sufficiently with the desulfurization slurry;
(3) discharging a gas-solid-liquid three-phase mixture from the top of the suspension bed reactor, and subjecting the mixture to gas liquid separation to produce a rich solution and a purified gas, wherein the purified gas was determined to have a $H_2S$ content of 46 ppm;
(4) feeding the purified gas into a fixed bed reactor filled with zinc oxide as desulfurizer for carrying out a second desulfurization, with keeping a gas flow rate of 5 m/s in the fixed bed reactor, to obtain a second purified gas which was, determined to have a $H_2S$ content of 4 ppm;
(5) feeding the rich solution into a flash evaporation tank having a pressure drop of 0.3 MPa for undergoing flash evaporation to remove light hydrocarbon, and then feeding the rich solution into a regeneration tank for undergoing reaction with air for 60 minutes, wherein the introduction amount of air during the reaction is 13 times of a theoretical consumption amount thereof, to produce a barren solution, wherein the regeneration efficiency is 81%; and the barren solution is then recycled to the Step (2) for being used as the desulfurization slurry;

replacing all of the rich solution in the regeneration tank with fresh desulfurization slurry when the rich solution reaches a sulfur capacity of 300%, considered as saturated, and subjecting the replaced rich solution to solid-liquid separation to produce solid sulfur and a liquid phase, wherein the solid sulfur is delivered out and the liquid phase is returned to the oxidation regeneration tank for being used as a recycling supplementary moisture.

Embodiment 6

As shown in FIG. 1, the desulfurization process using a combination of a suspension bed and a fixed bed provided by the present embodiment comprises the following steps:

(1) mixing amorphous iron oxide hydroxide having a particle size of 10-15 μm with water uniformly to prepare a desulfurization slurry having a concentration of 1.5 wt %;
(2) feeding a petrochemical gas having a $H_2S$ content of 123 g/$Nm^3$ into a coalescer tank to remove heavy components above C5, and mixing the petrochemical gas discharged from the coalescer tank with the desulfurization slurry to obtain a first mixture, and passing the first mixture into a suspension bed reactor having an empty tower gas velocity of 0.1 m/s from bottom to top, and controlling the first mixture to have a dwell time of 10-15 minutes in the suspension bed reactor such that the petrochemical gas contacts and reacts sufficiently with the desulfurization slurry;
(3) discharging a gas-solid-liquid three-phase mixture from the top of the suspension bed reactor, and subjecting the mixture to gas liquid separation to produce a rich solution and a purified gas, wherein the purified gas was determined to have a $H_2S$ content of 48 ppm;
(4) feeding the purified gas into a fixed bed reactor filled with copper oxide as desulfurizer for carrying out a second desulfurization, with keeping a gas flow rate of 10 m/s in the fixed bed reactor, to obtain a second purified gas which was determined to have a $H_2S$ content of 8 ppm;
(5) feeding the rich solution into a flash evaporation tank having a pressure drop of 0.1 MPa for undergoing flash evaporation to remove light hydrocarbon, and then feeding the rich solution into a regeneration tank for undergoing reaction with air for 35 minutes, wherein the introduction amount of air during the reaction process is 8 times of a theoretical consumption amount thereof, to produce a barren solution, wherein the regeneration efficiency is 65%; and the barren solution is then recycled to the Step (2) for being used as the desulfurization slurry;

replacing all of the rich solution in the regeneration tank with fresh desulfurization slurry when the rich solution reaches a sulfur capacity of 300%, considered as saturated, and subjecting the replaced rich solution to solid-liquid separation to produce solid sulfur and a liquid phase, wherein the solid sulfur is delivered out and the liquid phase is returned to the oxidation regeneration tank for being used as a recycling supplementary moisture.

Embodiment 7

As shown in FIG. 1, the desulfurization process using a combination of a suspension bed and a fixed bed provided by the present embodiment comprises the following steps:

(1) mixing amorphous iron oxide hydroxide having a particle size of 1-10 μm with water uniformly to prepare a desulfurization slurry having a concentration of 2.5 wt %;
(2) feeding a petrochemical gas having a $H_2S$ content of 89 g/$Nm^3$ into a coalescer tank to remove heavy components above C5, and mixing the petrochemical gas discharged from the coalescer tank with the desulfurization slurry to obtain a first mixture, and passing the first mixture into a suspension bed reactor having an empty tower gas velocity of 0.03 m/s from bottom to top, and controlling the first mixture to have a dwell time of 50-60 minutes in the suspension bed reactor such that the petrochemical gas contacts and reacts sufficiently with the desulfurization slurry;
(3) discharging a gas-solid-liquid three-phase mixture from the top of the suspension bed reactor, and subjecting the mixture to gas liquid separation to produce a rich solution and a purified gas, wherein the purified gas was determined to have a $H_2S$ content of 45 ppm;
(4) feeding the purified gas into a fixed bed reactor filled with amorphous iron oxide hydroxide as desulfurizer for carrying out a second desulfurization, with keeping a gas flow rate of 20 m/s in the fixed bed reactor, to obtain a second purified gas which was determined to have a $H_2S$ content of 7.5 ppm;
(5) feeding the rich solution into a flash evaporation tank having a pressure drop of 0.4 MPa for undergoing flash evaporation to remove light hydrocarbon, and then feeding the rich solution into a regeneration tank for undergoing reaction with air for 30-40 minutes, wherein the introduction amount of air during the reaction is 5 times of a theoretical consumption amount thereof, to produce a barren solution, wherein the regeneration efficiency is 80%; and the barren solution is then recycled to the Step (2) for being used as the desulfurization slurry;

replacing all of the rich solution in the regeneration tank with fresh desulfurization slurry when the rich solution reaches a sulfur capacity of 300%, considered as saturated, and subjecting the replaced rich solution to solid-liquid separation to produce solid sulfur and a liquid phase, wherein the solid sulfur is delivered out and the liquid phase is returned to the oxidation regeneration tank for being used as a recycling supplementary moisture.

Embodiment 8

The process provided by the above embodiments 1-7 of the present invention is carried out using the following integrated system, as shown in FIG. 1. The integrated system comprises:

a suspension bed reactor 2, provided with a feed inlet at bottom thereof and a discharge outlet at top thereof, and having a first sprinkler means 13 provided therein and disposed adjacent to the discharge outlet of the suspension bed reactor 2, and the suspension bed reactor 2 being filled with a mixture of a desulfurization slurry and a hydrogen sulfide containing gas, wherein the mixture has a dwell time of 5-60 min in the suspension bed reactor; and wherein alternatively, the desulfurization apparatus of the present embodiment is not limited to comprise one suspension bed reactor, and it may comprise two or more suspension bed reactors connected in series or in parallel;

a gas liquid separation tank 3, in connection with the discharge outlet of the suspension bed reactor 2, and provided with a rich solution outlet at bottom thereof and an exhaust port at top thereof; wherein the gas liquid separation tank 3 has a second sprinkler means 14 for spraying the desulfurization slurry, and the second sprinkler means 14 is provided inside the gas liquid separation tank 3 and disposed adjacent to the exhaust port of the gas liquid separation tank 3; and wherein the gas liquid separation tank 3 is provided with a low pressure condensate water return line and a low pressure steam return line on the outer side wall thereof; wherein alternatively, the desulfurization apparatus in this embodiment may comprise a plurality of gas liquid separation tanks according to the gas volume, the circulation amount of the slurry and the capacity of the equipment, etc., in order to prevent liquid from entering the fixed bed dry desulfurization unit and affecting the performance of the desulfurizer;

a fixed-bed reactor 6, connected to the exhaust port of the gas liquid separation tank 3, and provided with a purified gas outlet at the top thereof; wherein preferably, the present embodiment comprises two fixed bed reactors connected in series, to ensure smooth operation in case one of them encounters fluctuation and failure, or alternatively, comprises at least two fixed bed reactors connected in parallel;

a flash evaporation tank 4, in connection with the rich solution outlet of the gas liquid separation tank 3, and provided with a saturated liquid outlet at bottom thereof; wherein the flash evaporation tank 4 has a third sprinkler means 15 provided therein and disposed adjacent to a light hydrocarbon discharge outlet at the top of the flash evaporation tank 4;

an oxidation regeneration tank 5, in connection with the saturated liquid outlet of the flash evaporation tank 4, and provided with a barren solution outlet arranged at bottom thereof and in connection with the feed inlet of the suspension bed reactor 2; wherein the oxidation regeneration tank 5 has a fourth sprinkler means 16 provided at an upper portion thereof; and wherein the oxidation regeneration tank 5 is provided with an aerator 8 therein and a blower 7 and a aeration pump 9 in exterior thereof, wherein the blower and the aeration pump are respectively connected with the aerator 8, and the aeration pump 9 is connected with a liquid outlet in a lower portion of the oxidation regeneration tank 5;

a venturi mixer 10, having an outlet connected to a slurry inlet in an upper portion of the oxidative regeneration tank 5, and further having a desulfurizer inlet and a water inlet;

and a solid liquid separator (not shown in the drawings), in connection with a saturated liquid outlet arranged in a lower portion of the oxidation regeneration tank 5, and provided with an water outlet which is respectively connected with an water inlet of each of the first sprinkler, the third sprinkler, the fourth sprinkler and the venturi mixer 10.

As an alternative embodiment, the present embodiment further comprises a coalescer 1 having an exhaust port communicating with the feed inlet of the suspension bed reactor 2.

When the integrated system according to the present invention is shut down, water is sprayed into the suspension bed reactor 2 by the first sprinkler means 13 in order to achieve the purpose of cleaning. In addition, the desulfurization slurry is sprayed into the gas liquid separation tank by the second sprinkler means 14, water is sprayed into the flash evaporation tank 4 by the third sprinkler means 15, and water is sprayed into the oxidation regeneration tank 5 by the fourth sprinkler means 16, all of which serve the purpose of preventing sulfur from accumulating in the liquid surface, so all of them play a role of scouring.

It is obvious that the above embodiments are given by way of illustration only, and thus are not limitative of the present invention. Those skilled in the art should understand, any equivalent alternatives derived on the basis of the present invention should be embraced within the protection scope of the present invention.

The invention claimed is:

1. A desulfurization process using a combination of a suspension bed and a fixed bed, comprising the following steps:
   (1), mixing a desulfurizer with water uniformly to prepare a desulfurization slurry;
   (2), mixing the desulfurization slurry with a hydrogen sulfide containing gas to obtain a first mixture, and passing the first mixture into a suspension bed reactor from bottom to top, with controlling the first mixture to have a dwell time of 5-60 minutes in the suspension bed reactor to allow the desulfurization slurry to contact and react sufficiently with the hydrogen sulfide containing gas;
   (3), discharging a second mixture from the top of the suspension bed reactor, and subjecting the second mixture to gas liquid separation, and collecting a gas phase; and
   (4), feeding the gas phase into a fixed bed reactor for carrying out a second desulfurization to obtain a purified gas.

2. The desulfurization process of claim 1, wherein, in step (1), the desulfurizer has a particle size of no greater than 20 µm.

3. The desulfurization process of claim 1, wherein, the desulfurizer is selected from a group consisting of amorphous iron oxide hydroxide, iron oxide, iron hydroxide or any mixture thereof.

4. The desulfurization process of claim 1, wherein, the desulfurization slurry has a desulfurizer concentration of 1-5 wt %.

5. The desulfurization process of claim 1, wherein, the desulfurization slurry has a desulfurizer concentration of 2-3 wt %.

6. The desulfurization process of claim 1, wherein, the hydrogen sulfide containing gas is selected from a group consisting of biogas, coke oven gas, oilfield associated gas, natural gas, petrochemical gas or any mixture thereof.

7. The desulfurization process of claim 1, wherein, the suspension bed reactor has an empty tower gas velocity of 0.03-0.3 m/s.

8. The desulfurization process of claim 1, wherein, there is one suspension bed reactor, or
   at least two suspension bed reactors connected in series and/or in parallel.

9. The desulfurization process of claim 1, wherein, in step (4), the fixed bed reactor comprises a desulfurizer selected from a group consisting of amorphous iron oxide hydroxide, iron oxide, iron hydroxide, copper oxide, zinc oxide, and any mixture thereof.

10. The desulfurization process of claim 1, wherein, the fixed bed reactor has a gas flow rate of from 1 to 20 m/s.

11. The desulfurization process of claim 2, wherein, the desulfurizer is selected from a group consisting of amorphous iron oxide hydroxide, iron oxide, iron hydroxide or any mixture thereof.

12. The desulfurization process of claim 2, wherein, the desulfurization slurry has a desulfurizer concentration of 1-5 wt %.

13. The desulfurization process of claim 2, wherein, the desulfurization slurry has a desulfurizer concentration of 2-3 wt %.

14. The desulfurization process of claim 2, wherein, the hydrogen sulfide containing gas is selected from a group consisting of biogas, coke oven gas, oilfield associated gas, natural gas, petrochemical gas or any mixture thereof.

15. The desulfurization process of claim 2, wherein, the suspension bed reactor has an empty tower gas velocity of 0.03-0.3 m/s.

16. The desulfurization process of claim 2, wherein, there is one suspension bed reactor, or
   at least two suspension bed reactors connected in series and/or in parallel.

17. The desulfurization process of claim 2, wherein, in step (4), the fixed bed reactor comprises a desulfurizer selected from a group consisting of amorphous iron oxide hydroxide, iron oxide, iron hydroxide, copper oxide, zinc oxide, and any mixture thereof.

18. The desulfurization process of claim 2, wherein, the fixed bed reactor has a gas flow rate of from 1 to 20 m/s.

19. The desulfurization process of claim 1, wherein, the suspension bed reactor has an empty tower gas velocity of 0.05-0.2 m/s.

20. The desulfurization process of claim 2, wherein, the suspension bed reactor has an empty tower gas velocity of 0.05-0.2 m/s.

* * * * *